United States Patent
Watkins et al.

(10) Patent No.: US 11,829,233 B2
(45) Date of Patent: Nov. 28, 2023

(54) FAILURE PREDICTION IN A COMPUTING SYSTEM BASED ON MACHINE LEARNING APPLIED TO ALERT DATA

(71) Applicant: ServiceNow, Inc., Santa Clara, CA (US)

(72) Inventors: Matthew Lawrence Watkins, San Diego, CA (US); Dinesh Kumar Kishorkumar Surapaneni, Chicago, IL (US); Baskar Jayaraman, Santa Clara, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 17/576,490

(22) Filed: Jan. 14, 2022

(65) Prior Publication Data
US 2023/0229542 A1 Jul. 20, 2023

(51) Int. Cl.
*G06F 11/07* (2006.01)
*G06F 18/214* (2023.01)
*G06F 18/21* (2023.01)

(52) U.S. Cl.
CPC ........ *G06F 11/0781* (2013.01); *G06F 18/214* (2023.01); *G06F 18/2178* (2023.01)

(58) Field of Classification Search
CPC . G06F 11/0781; G06F 18/2178; G06F 18/214
(Continued)

(56) References Cited

U.S. PATENT DOCUMENTS

| 4,941,084 A | 7/1990 | Terada et al. |
| 5,185,860 A | 2/1993 | Wu |

(Continued)

FOREIGN PATENT DOCUMENTS

| CA | 3082398 A1 * | 5/2019 | .......... G05B 19/418 |
| CN | 112988529 A * | 6/2021 | |

(Continued)

OTHER PUBLICATIONS

"Now on Now: Using predictive modeling on the Now Platform® to help avoid customer outages," servicenow, 2021.
(Continued)

*Primary Examiner* — Chae M Ko
(74) *Attorney, Agent, or Firm* — McDonnell Boehnen Hulbert & Berghoff LLP

(57) ABSTRACT

An embodiment may involve persistent storage containing a machine learning trainer application configured to apply one or more learning algorithms. One or more processors may be configured to: obtain alert data from one or more computing systems; generate training vectors from the alert data, wherein elements within each of the training vectors include: results of a set of statistics applied to the alert data for a particular computing system of the one or more computing systems, and an indication of whether the particular computing system is expected to fail given its alert data; train, using the machine learning trainer application and the training vectors, a machine learning model, wherein the machine learning model is configured to predict failure of a further computing system based on operational alert data obtained from the further computing system; and deploy the machine learning model for production use.

20 Claims, 15 Drawing Sheets

(58) Field of Classification Search
USPC .................................. 714/47.1–47.3, 26
See application file for complete search history.

(56) References Cited

U.S. PATENT DOCUMENTS

| | | | |
|---|---|---|---|
| 5,237,518 A | 8/1993 | Sztipanovits et al. |
| 5,261,097 A | 11/1993 | Saxon |
| 5,265,252 A | 11/1993 | Rawson, III et al. |
| 5,367,685 A | 11/1994 | Gosling |
| 5,390,297 A | 2/1995 | Barber et al. |
| 5,442,791 A | 8/1995 | Wrabetz et al. |
| 5,452,415 A | 9/1995 | Hotka |
| 5,522,042 A | 5/1996 | Fee et al. |
| 5,533,116 A | 7/1996 | Vesterinen |
| 5,655,081 A | 8/1997 | Bonnell et al. |
| 5,659,736 A | 8/1997 | Hasegawa et al. |
| 5,671,412 A | 9/1997 | Christiano |
| 5,696,701 A | 12/1997 | Burgess et al. |
| 5,715,463 A | 2/1998 | Merkin |
| 5,745,879 A | 4/1998 | Wyman |
| 5,761,502 A | 6/1998 | Jacobs |
| 5,764,913 A | 6/1998 | Jancke et al. |
| 5,887,139 A | 3/1999 | Madison, Jr. et al. |
| 5,909,217 A | 6/1999 | Bereiter |
| 5,937,165 A | 8/1999 | Schwaller et al. |
| 5,949,976 A | 9/1999 | Chappelle |
| 5,978,594 A | 11/1999 | Bonnell et al. |
| 6,021,437 A | 2/2000 | Chen et al. |
| 6,041,347 A | 3/2000 | Harsham et al. |
| 6,088,717 A | 7/2000 | Reed et al. |
| 6,101,500 A | 8/2000 | Lau |
| 6,128,016 A | 10/2000 | Coelho et al. |
| 6,131,118 A | 10/2000 | Stupek, Jr. et al. |
| 6,134,581 A | 10/2000 | Ismael et al. |
| 6,138,122 A | 10/2000 | Smith et al. |
| 6,148,335 A | 11/2000 | Haggard et al. |
| 6,166,732 A | 12/2000 | Mitchell et al. |
| 6,167,448 A | 12/2000 | Hemphill et al. |
| 6,175,866 B1 | 1/2001 | Holloway et al. |
| 6,175,878 B1 | 1/2001 | Seaman et al. |
| 6,260,050 B1 | 7/2001 | Yost et al. |
| 6,263,457 B1 | 7/2001 | Anderson et al. |
| 6,272,150 B1 | 8/2001 | Hrastar et al. |
| 6,336,138 B1 | 1/2002 | Caswell et al. |
| 6,363,421 B2 | 3/2002 | Barker et al. |
| 6,393,386 B1 | 5/2002 | Zager et al. |
| 6,397,245 B1 | 5/2002 | Johnson, II et al. |
| 6,434,626 B1 | 8/2002 | Prakash et al. |
| 6,438,592 B1 | 8/2002 | Killian |
| 6,456,306 B1 | 9/2002 | Chin et al. |
| 6,466,932 B1 | 10/2002 | Dennis et al. |
| 6,487,590 B1 | 11/2002 | Foley et al. |
| 6,505,248 B1 | 1/2003 | Casper et al. |
| 6,526,442 B1 | 2/2003 | Stupek, Jr. et al. |
| 6,621,823 B1 | 9/2003 | Mellquist et al. |
| 6,707,795 B1 | 3/2004 | Noorhosseini et al. |
| 6,742,015 B1 | 5/2004 | Bowman-Amuah |
| 6,763,380 B1 | 7/2004 | Mayton et al. |
| 6,816,898 B1 | 11/2004 | Scarpelli et al. |
| 6,895,586 B1 | 5/2005 | Brasher et al. |
| 6,948,175 B1 | 9/2005 | Fong et al. |
| 6,985,901 B1 | 1/2006 | Sachse et al. |
| 7,003,564 B2 | 2/2006 | Greuel et al. |
| 7,028,228 B1 | 4/2006 | Lovy et al. |
| 7,043,537 B1 | 5/2006 | Pratt |
| 7,043,661 B2 | 5/2006 | Valadarsky et al. |
| 7,062,683 B2 | 6/2006 | Warpenburg et al. |
| 7,096,459 B2 | 8/2006 | Keller et al. |
| 7,146,574 B2 | 12/2006 | Goldthwaite et al. |
| 7,197,466 B1 | 3/2007 | Peterson et al. |
| 7,215,360 B2 | 5/2007 | Gupta |
| 7,216,304 B1 | 5/2007 | Gourdol et al. |
| 7,222,147 B1 | 5/2007 | Black et al. |
| 7,281,170 B2 | 10/2007 | Taylor et al. |
| 7,412,502 B2 | 8/2008 | Fearn et al. |
| 7,505,872 B2 | 3/2009 | Keller et al. |
| 7,593,013 B2 | 9/2009 | Agutter et al. |
| 7,596,716 B2 | 9/2009 | Frost et al. |
| 7,617,073 B2 | 11/2009 | Trinon et al. |
| 7,660,731 B2 | 2/2010 | Chaddha et al. |
| 7,676,294 B2 | 3/2010 | Baier et al. |
| 7,676,437 B2 | 3/2010 | Satkunanathan et al. |
| 7,840,490 B1 | 11/2010 | Sellers et al. |
| 7,877,783 B1 | 1/2011 | Cline et al. |
| 7,890,869 B1 | 2/2011 | Mayer et al. |
| 7,966,398 B2 | 6/2011 | Wiles, Jr. |
| 8,060,396 B1 | 11/2011 | Bessler et al. |
| 8,196,210 B2 | 6/2012 | Sterin |
| 8,321,948 B2 | 11/2012 | Robinson et al. |
| 8,407,669 B2 | 3/2013 | Yee et al. |
| 8,554,750 B2 | 10/2013 | Rangarajan et al. |
| 8,595,647 B2 | 11/2013 | Sabin et al. |
| 8,620,818 B2 | 12/2013 | Hughes et al. |
| 8,646,093 B2 | 2/2014 | Myers et al. |
| 8,674,992 B2 | 3/2014 | Poston et al. |
| 8,725,647 B2 | 5/2014 | Disciascio et al. |
| 9,053,460 B2 | 6/2015 | Gilbert et al. |
| 10,673,963 B1 | 6/2020 | Feiguine et al. |
| 10,749,943 B1 | 8/2020 | Feiguine et al. |
| 10,771,344 B2 | 9/2020 | Bitterfeld et al. |
| 10,824,650 B2 | 11/2020 | Bar Oz et al. |
| 10,944,654 B2 | 3/2021 | Rimar et al. |
| 11,089,115 B2 | 8/2021 | Garty et al. |
| 11,095,506 B1 | 8/2021 | Erblat et al. |
| 11,316,941 B1* | 4/2022 | Jain .................. H04L 41/0816 |
| 2002/0116340 A1 | 8/2002 | Hellberg et al. |
| 2002/0133584 A1 | 9/2002 | Greuel et al. |
| 2002/0158969 A1 | 10/2002 | Gupta |
| 2003/0118087 A1 | 6/2003 | Goldthwaite et al. |
| 2003/0200293 A1 | 10/2003 | Fearn et al. |
| 2005/0015217 A1 | 1/2005 | Weidl et al. |
| 2005/0091356 A1 | 4/2005 | Izzo |
| 2006/0026453 A1 | 2/2006 | Frost et al. |
| 2006/0095461 A1 | 5/2006 | Raymond |
| 2006/0179058 A1 | 8/2006 | Bram et al. |
| 2006/0293942 A1 | 12/2006 | Chaddha et al. |
| 2007/0033279 A1 | 2/2007 | Battat et al. |
| 2007/0188494 A1 | 8/2007 | Agutter et al. |
| 2007/0288389 A1 | 12/2007 | Vaughan et al. |
| 2008/0133289 A1 | 6/2008 | Armour et al. |
| 2008/0148253 A1 | 6/2008 | Badwe et al. |
| 2008/0319779 A1 | 12/2008 | Hughes et al. |
| 2009/0088875 A1 | 4/2009 | Baier et al. |
| 2009/0228984 A1 | 9/2009 | Sterin |
| 2010/0110932 A1 | 5/2010 | Doran et al. |
| 2016/0378076 A1* | 12/2016 | Hill .................. G05B 19/4184 700/28 |
| 2017/0343471 A1* | 11/2017 | Malanoski ............. G06F 3/147 |
| 2018/0123940 A1 | 5/2018 | Rimar et al. |
| 2018/0287856 A1* | 10/2018 | Whitner ............. H04L 41/0613 |
| 2019/0104398 A1 | 4/2019 | Owen et al. |
| 2020/0050689 A1 | 2/2020 | Tal et al. |
| 2020/0110181 A1* | 4/2020 | Lu .................. G05B 23/0221 |
| 2020/0182684 A1* | 6/2020 | Yoskovitz ............. G01V 3/081 |
| 2020/0204443 A1 | 6/2020 | Bar Oz et al. |
| 2020/0311736 A1* | 10/2020 | Song .................. G06Q 20/4014 |
| 2020/0409809 A1* | 12/2020 | Liu .................. G06F 11/1662 |
| 2021/0026321 A1* | 1/2021 | Gomez .................. G06N 3/08 |
| 2021/0192387 A1 | 6/2021 | Benson |
| 2021/0194764 A1 | 6/2021 | Badyan et al. |
| 2021/0357282 A1 | 11/2021 | Verma |
| 2022/0217154 A1* | 7/2022 | Song .................. H04L 51/23 |

FOREIGN PATENT DOCUMENTS

| | | |
|---|---|---|
| CN | 110598802 B | 7/2021 |
| EP | 0433979 | 6/1991 |
| EP | 1607824 | 12/2005 |
| WO | WO 99/34285 | 7/1999 |
| WO | WO 00/52559 | 9/2000 |
| WO | WO 01/79970 | 10/2001 |

(56) References Cited

FOREIGN PATENT DOCUMENTS

WO   2019236386 A1   12/2019
WO   2020068471 A1    4/2020

OTHER PUBLICATIONS

"Rome IT Operations Management," servicenow, Nov. 29, 2021.
International Search Report and Written Opinion, PCT Application PCT/US2022/081247, dated Apr. 20, 2023.

* cited by examiner

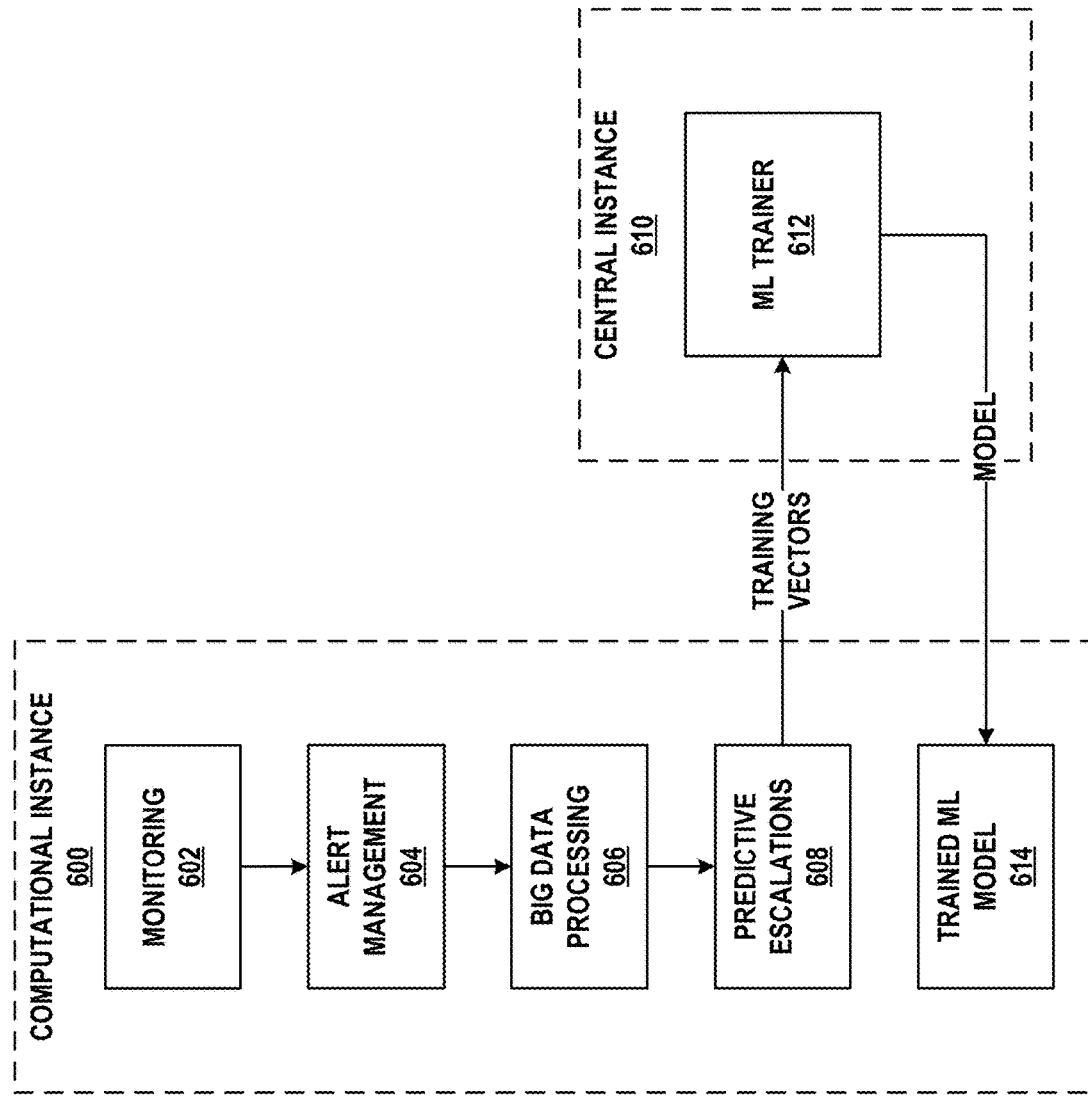

← 902

← 904 escalation_decision: Not Proposed prediction_confidence: 99.95741248 mean_duration: 10.49998369
mean_peak_ratio: 0.200018912
median_duration: 10.49995364
median_peak_ratio: 0.199956759
total_alert_count: 1.999962537
diversity: 0.999988328
alert_type_stddev: 2.62771E-05
alert_type_variance: -3.84748E-05
alert_group_one: 4.44065E-05
alert_group_two: 2.00499E-05
alert_group_three: 1.999984307
alert_group_four: -1.72503E-05
group_one_decay_duration: 4.83323E-05
group_one_decay_peak: 0.000002953
group_one_decay_count: 3.00616E-05
group_one_dispersion_duration: 3.72116E-05
group_one_dispersion_peak: -1.14227E-05
group_one_dispersion_count: -6.15056E-05
group_one_regression_duration: 2.63017E-05
group_one_regression_peak: -8.3471E-06
group_one_regression_count: -3.20736E-05
group_two_decay_duration: 1.45308E-05
group_two_decay_peak: 0.000001828
group_two_decay_count: 1.91412E-05
group_two_dispersion_duration: -4.07029E-05
group_two_dispersion_peak: 4.90695E-05
group_two_dispersion_count: -2.33968E-05
group_two_regression_duration: 1.65922E-05
group_two_regression_peak: -2.57396E-05
group_two_regression_count: 2.87533E-05 group_three_decay_duration: 10.04419314
group_three_decay_peak: 0.199969424
group_three_decay_count: 0.956559508
group_three_dispersion_duration: 15.75004449
group_three_dispersion_peak: 1.50513E-05
group_three_dispersion_count: 0.142857143
group_three_regression_duration: 0.086206897
group_three_regression_peak: 0.000821018
group_three_regression_count: 0.008210181
group_four_decay_duration: 0.000038735
group_four_decay_peak: -0.000035744
group_four_decay_count: -3.38482E-05
group_four_dispersion_duration: -2.21398E-05
group_four_dispersion_peak: -8.7674E-06
group_four_dispersion_count: -1.71694E-05
group_four_regression_duration: 2.49972E-05
group_four_regression_peak: 2.38035E-05
group_four_regression_count: 9.2228E-06

FAILURE PREDICTION IN A COMPUTING SYSTEM BASED ON MACHINE LEARNING APPLIED TO ALERT DATA

BACKGROUND

Modern computing systems are complex entities, often consisting of multiple computing instances, nodes, or resources, each capable of performing a vast array of applications or services. As a result, even the best software engineering practices cannot prevent defects or unexpected system behaviors. Some such defects can lead to poor performance, instability, or even outages if not corrected. But aside from a handful of general indicators of system health, it can be difficult to identify measurable system attributes that are predictive of failures.

SUMMARY

The embodiments herein address these and potentially other current limitations by gathering alert data on an operational computing system. The alert data may be related to attributes of the computing system having certain values. It has been observed that before a computing system is impaired due to a defect, there may be markers related to the defect found within such alert data. Thus, there is a period of time during which a failure is predictable but has not yet occurred. The challenge is that there may be hundreds or thousands of such alerts, and it might not be clear which alerts should be considered or what patterns of alerts are likely to result in failure.

Given the scale and opacity of the available alert data, machine learning models are well-situated to assist in these predictive tasks. Accordingly, a machine learning model can be trained with alert data. The training may involve formulating a set of training vectors, where each training vector includes information related to alerts generated by the computing system over a period of time. This information may involve statistics based on types, volumes, durations, and/or patterns of individual alerts or combinations of alerts, as well as an indication of whether a computing system exhibiting these types, volumes, durations, and/or patterns has failed or is considered likely to fail. The indications of failure may be derived from actual failures or human expert knowledge.

Once trained in this manner, the model can be applied periodically or from time to time to data from operational computing systems. In doing so, the model can predict whether the operational computing system is expected to fail in the relatively near future. If so, administrators can be notified through escalation procedures so that they can carry out preventative maintenance. In experiments, the embodiments herein can correctly predict conditions that human experts would considering signs of impending system failure 99% of the time.

Accordingly, a first example embodiment may involve obtaining alert data from one or more computing systems; generating training vectors from the alert data, wherein elements within each of the training vectors include: results of a set of statistics applied to the alert data for a particular computing system of the one or more computing systems, and an indication of whether the particular computing system is expected to fail given its alert data; training, using a machine learning trainer application and the training vectors, a machine learning model, wherein the machine learning model is configured to predict failure of a further computing system based on operational alert data obtained from the further computing system; and deploying the machine learning model for production use.

A second example embodiment may involve receiving operational alert data obtained from a target computing system; applying a machine learning model to the operational alert data, wherein the machine learning model was trained using a machine learning trainer application and training vectors, wherein elements within each of the training vectors include: results of a set of statistics applied to alert data for a particular computing system, and an indication of whether the particular computing system is expected to fail given its alert data; and obtaining, from the machine learning model, the indication of whether the target computing system is predicted to fail given the operational alert data.

In a third example embodiment, an article of manufacture may include a non-transitory computer-readable medium, having stored thereon program instructions that, upon execution by a computing system, cause the computing system to perform operations in accordance with the first and/or second example embodiment.

In a fourth example embodiment, a computing system may include at least one processor, as well as memory and program instructions. The program instructions may be stored in the memory, and upon execution by the at least one processor, cause the computing system to perform operations in accordance with the first and/or second example embodiment.

In a fifth example embodiment, a system may include various means for carrying out each of the operations of the first and/or second example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 6A depicts training a machine learning model, in accordance with example embodiments.

FIG. 9 depicts an alert-related vector, in accordance with example embodiments.

DETAILED DESCRIPTION

Figure 1:
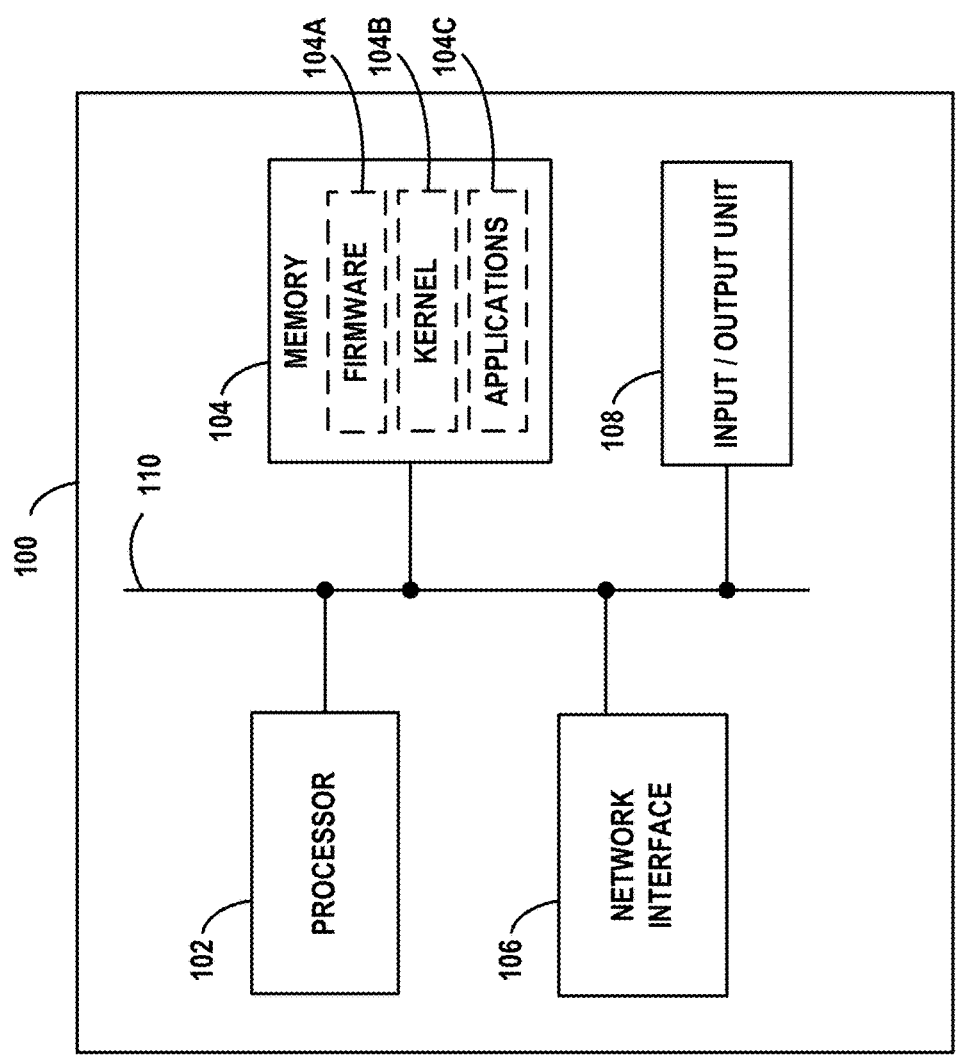
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security. Nonetheless, the embodiments herein are not limited to enterprise applications or environments, and can be more broadly applied.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, and delete (CRUD) capabilities. This allows new applications to be built on a common application infrastructure. In some cases, applications structured differently than MVC, such as those using unidirectional data flow, may be employed.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HTML and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling, and management of processes, input/output, and communication. Kernel 104B may also include device drivers that allow the operating system to communicate with the hardware modules (e.g., memory units, networking interfaces, ports, and buses) of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
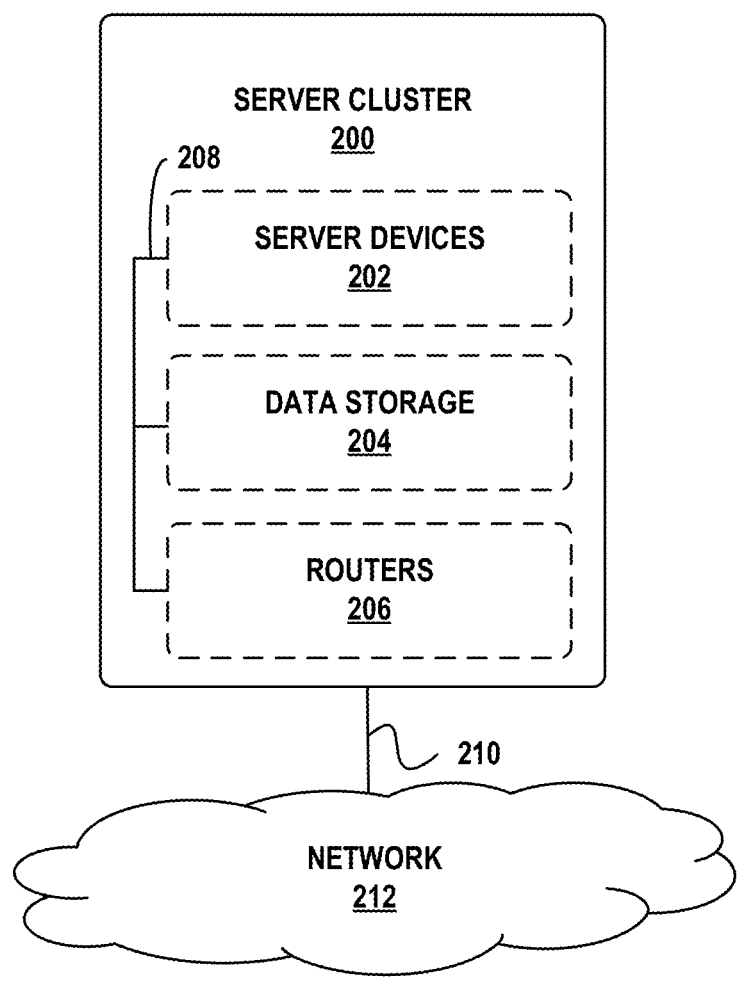
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. Example Remote Network Management Architecture

Figure 3:
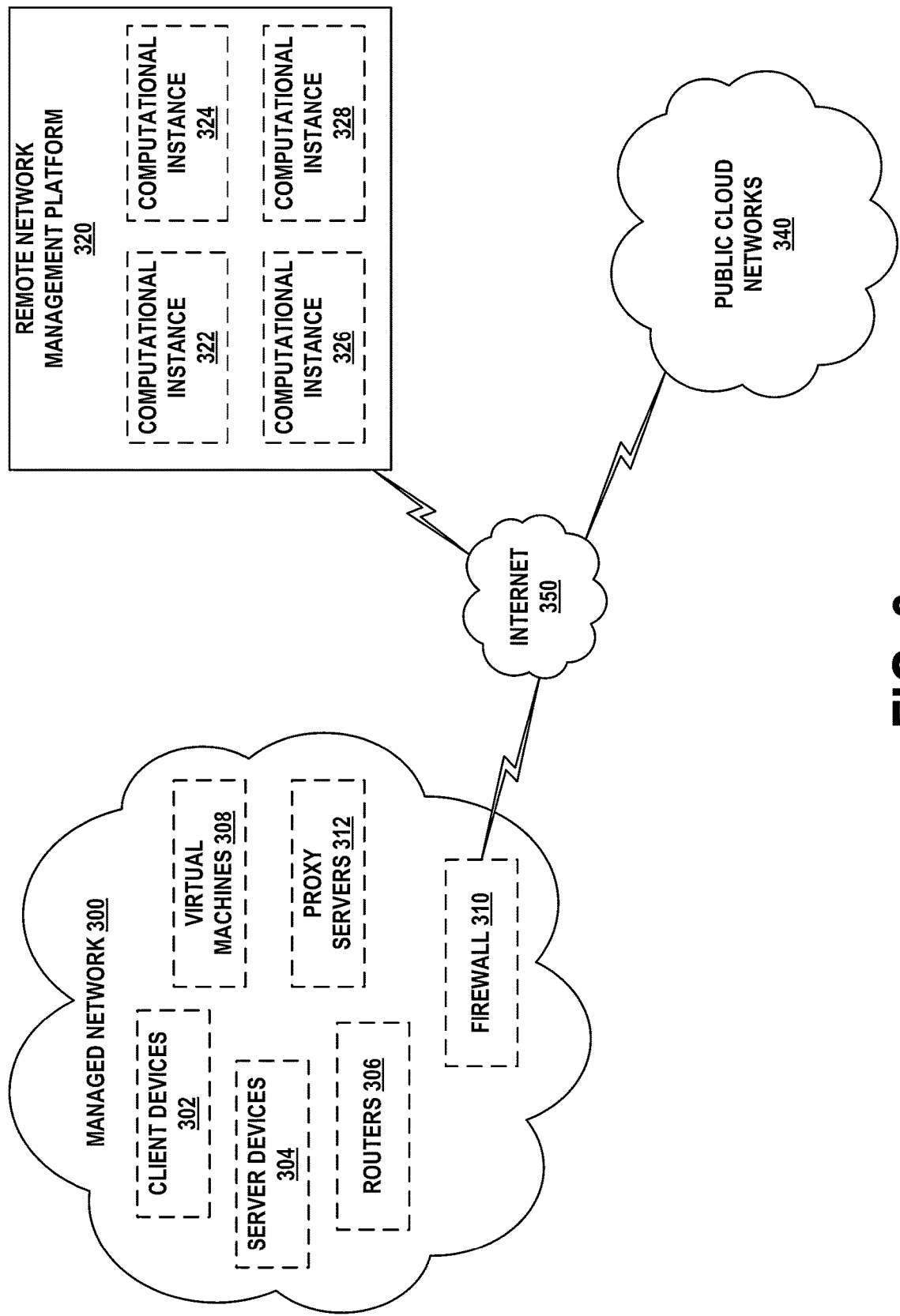
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of public cloud networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks. Remote network management platform 320 may also be referred to as a multi-application platform.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may affect all customers' data, creating additional risk, especially for entities subject to governmental, healthcare, and/or financial regulation. Furthermore, any database operations that affect one customer will likely affect all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include AMAZON WEB SERVICES® and MICROSOFT® AZURE®. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
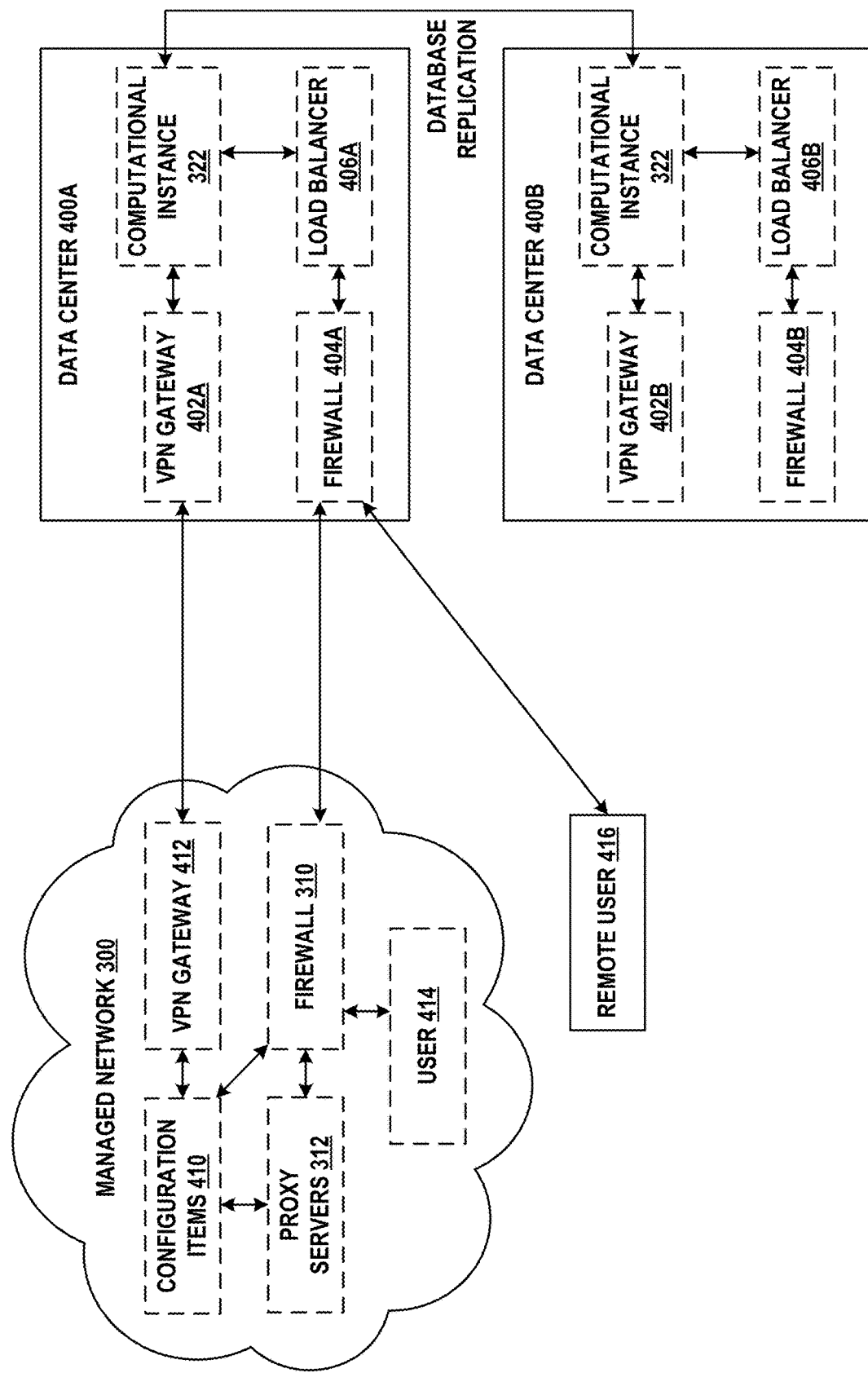
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated, in whole or in part, across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, as well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purposes of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
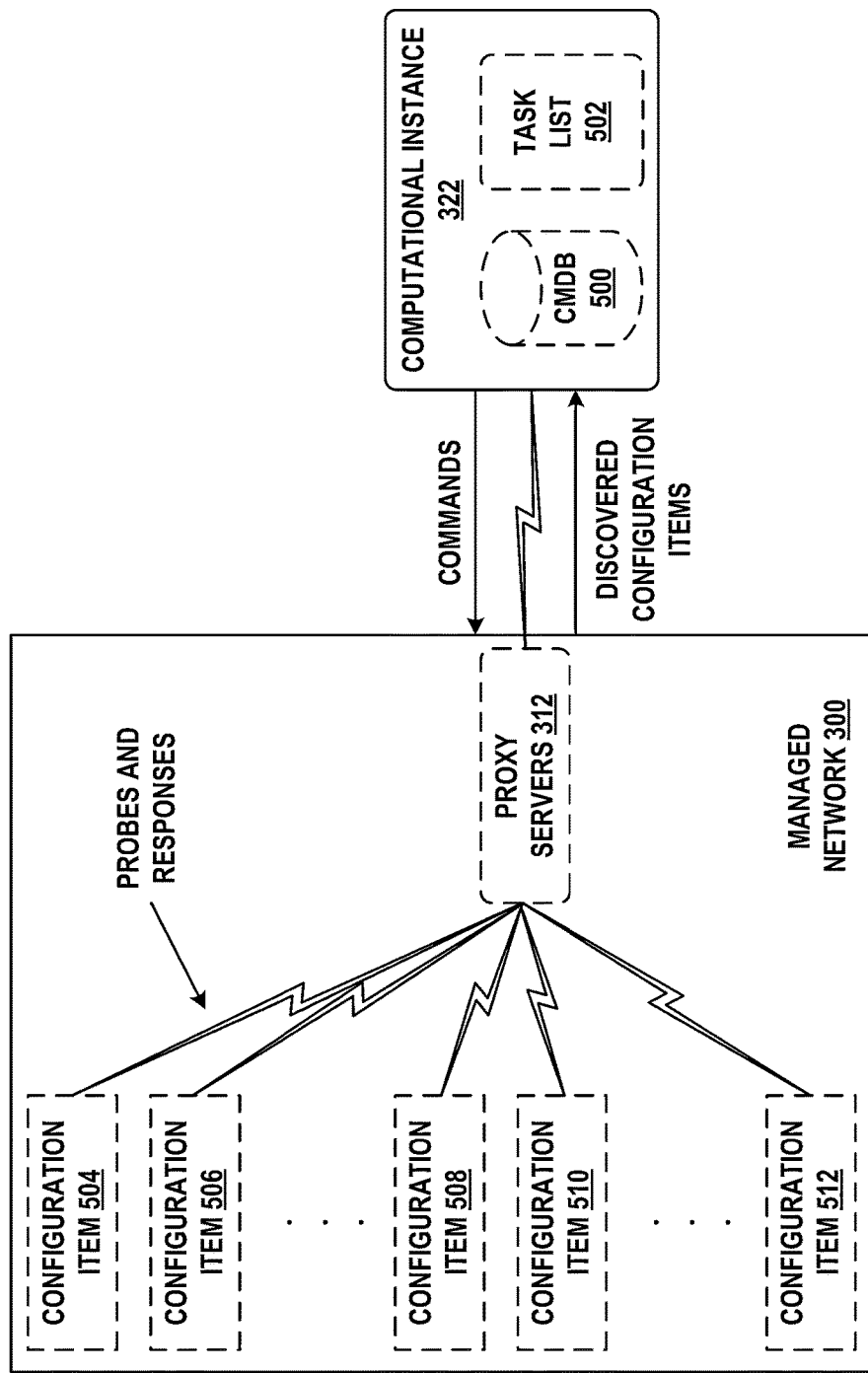
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, public cloud networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration, and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For example, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
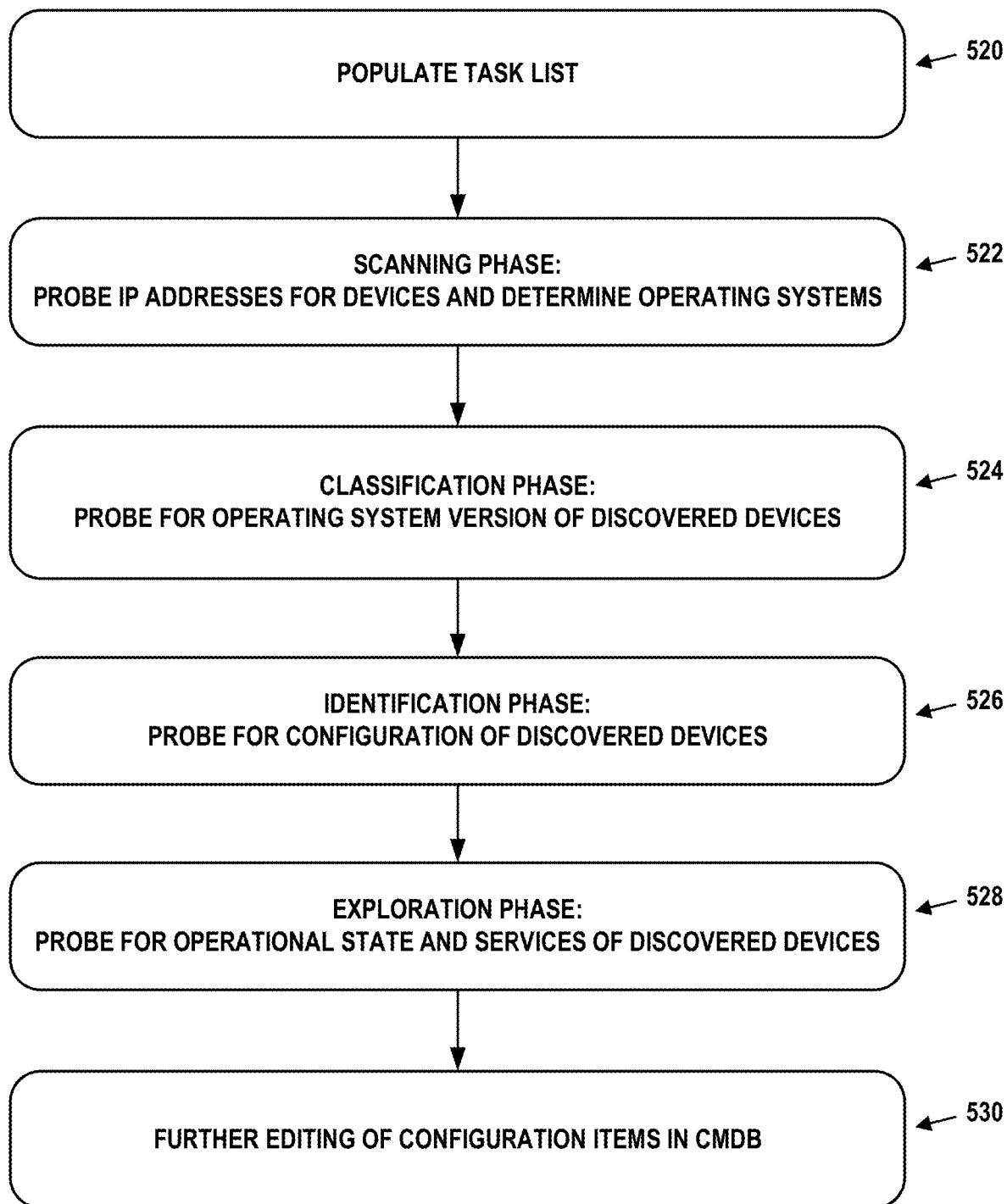
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are examples. Discovery may be a highly configurable procedure that can have more or fewer phases, and the operations of each phase may vary. In some cases, one or more phases may be customized, or may otherwise deviate from the exemplary descriptions above.

In this manner, a remote network management platform may discover and inventory the hardware, software, and services deployed on and provided by the managed network. As noted above, this data may be stored in a CMDB of the associated computational instance as configuration items. For example, individual hardware components (e.g., computing devices, virtual servers, databases, routers, etc.) may be represented as hardware configuration items, while the applications installed and/or executing thereon may be represented as software configuration items.

The relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

The relationship between a service and one or more software configuration items may also take various forms. As an example, a web service may include a web server software configuration item and a database application software configuration item, each installed on different hardware configuration items. The web service may have a "depends on" relationship with both of these software configuration items, while the software configuration items have a "used by" reciprocal relationship with the web service. Services might not be able to be fully determined by discovery procedures, and instead may rely on service mapping (e.g., probing configuration files and/or carrying out network traffic analysis to determine service level relationships between configuration items) and possibly some extent of manual configuration.

Regardless of how relationship information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

V. Computing System Failure and Predictive Modeling Based on Alerts

Given the importance of computational instances to enterprise operations, it is beneficial to be able to accurately predict when a computational instance (or a component thereof, or any other type of computing device for that matter) is likely to fail. But today's systems are insufficient for this complex task.

Herein, a "failure" may be any form of fault, such as a crash, a freeze, an unusually or unexpectedly lengthy delay, or another improper or undesirable behavior of a computing system. Failures can take the form of outages (i.e., a computational instance is unavailable) or impaired performance (e.g., a computational instance provides results slowly or provides incorrect results). In some cases (e.g., outages), a failure may be apparent to users. In other cases (e.g., incorrect results), users might not be aware that a failure is occurring.

A list of possible attributes that can be monitored and used as the basis for alert generation are shown in Table 1 below. Each attribute can be assigned a type, which generally describes the system component to which the attribute is related. Types may be organized differently than shown. Alerts derived from a certain attribute may be defined to be of the same type as the attribute. Also, the description of each attribute suggests the form of its respective value (e.g., a percentage, a count, a difference). This is necessarily not a complete list, and thus other attributes may be available.

TABLE 1

| Attribute | Type | Description |
| --- | --- | --- |
| Processor utilization | Processor | Percent of processor capacity currently in use |
| Volatile memory utilization | Memory | Percent of system RAM currently in use |
| Non-volatile memory utilization | Memory | Percent of system long-term storage currently in use |
| Network utilization | Network | Percent of system network interface capacity currently in use |
| GUI transactions | GUI | Number of graphical user interface requests initiated by users |
| GUI response time | GUI | The difference between when the system receives a GUI request and provides a response |
| User sessions | Users | Number of users currently logged on to the system |
| Semaphore wait queue occupancy | Semaphore | Number of threads currently waiting on a semaphore (semaphores control access to critical sections of code that must be executed serially) |
| Logged errors | Log | Number of system errors logged by any aspects of the system |
| HTTP node memory utilization | HTTP node | Memory used by an HTTP node (e.g. a web server) |
| HTTP node response time | HTTP node | The difference between when an HTTP node receives a HTTP request and provides a response |

Current methodologies for predicting failures are rudimentary. General indications of system health, such as processor utilization, main memory utilization, non-volatile memory utilization, and network capacity utilization, can be used to obtain a high-level picture of system performance. For instance, a performance monitor (often a separate unit of software executing on the same or different hardware as the computational instance) may be configured to detect when any of these attributes becomes higher than 80%. When this happens, the performance monitor may transmit a notification to one or more administrators (e.g., by way of email, text message, phone call, etc.).

In general, a performance monitor may generate an alert when the value of a monitored attribute crosses a pre-defined threshold in a certain direction (e.g., from below the threshold to above the threshold). If this attribute value later crosses its pre-defined threshold in the other direction (e.g., from above the threshold to below the threshold), the alert may be cancelled. In that case, the performance monitor may generate an alert cancellation.

Alerting implementations may include some form of hysteresis, where alerts and alert cancellations are throttled so that they do not rapidly ping-pong over a threshold. This may involve using high and low thresholds in place of a single predefined threshold. Then, for example, alerts are generated when an attribute value passes from below to above the high threshold, and alert cancellations are generated when the attribute value passes from above to below the low threshold. Alternatively, an attribute value may be required to be above the predefined threshold for some period of time before an alert is generated, and below the predefined threshold for some period of time before an alert cancellation is generated.

In some cases, alerts are compound, in the sense that an alert is generated only when two or more monitored attribute values both exceed pre-defined thresholds. These alerts are cancelled when one or more of these attribute values no longer exceed their respective thresholds.

Regardless, the duration of an alert is the amount of time between when an alert is generated and its associated alert cancellation is generated. Each alert and alert cancellation may share a unique identifier so that they can be correlated. When an alert has been generated and is not yet cancelled, it may be referred to as active. Otherwise, it may be referred to as inactive.

But considering alerts in isolation can lead to false positives. For example, many computing systems can function in a stable fashion even when one or more alerts are active. For instance, certain combinations of attribute values (e.g., processor utilization over 95% and volatile memory utilization over 70%) may be strongly indicative of an impending failure, even if individual attribute values being above the same thresholds are not.

There may be numerous such combinations of alert types (e.g., the same as the attribute types shown in Table 1), alert volumes, alert durations, and/or alert patterns that can be predictive of failures, some of which may be unknown even to human experts. Additionally, some computing system instabilities present themselves over time, and may not be apparent by just viewing a snapshot of system state as represented by the alerts active at any given moment.

The embodiments herein overcome these limitations by training a machine learning (ML) model based on various statistics related to alert types, alert volumes, alert durations, and/or alert patterns. This model, once trained, is capable of predicting whether a computing system exhibiting certain alerting behavior is likely to fail in the near future.

To train the model, a set of training vectors are obtained. Each training vector includes a number of alert-related statistics, along with an indication of whether a computing system exhibiting these alert-related statistics has failed or would be expected to fail. The indication may be a ground truth value (e.g., a certain combination of alert-related statistics has or has not resulted in a failure in an actual computing system) or an assessment by a human expert (e.g., a certain combination of alert-related statistics is deemed likely to result in a failure or unlikely to result in a failure).

Once trained, the model can be deployed and applied to alert data received from an operational computing system (e.g., a computational instance being employed for production by a number of users). The model may use this alert data and its trained structure to predict whether the operational computing system is likely to fail in the future (e.g., within the next few minutes, hours, or days). When a failure is predicted, administrators of the computing system may be notified so that they can carry out preventative maintenance.

VI. Example Architecture

A block diagram of a software architecture for training of an ML model is shown in FIG. 6A. In this diagram, some software functionality is distributed between computational instance 600 (e.g., a computational instance dedicated to a particular enterprise, not unlike computational instance 322) and central instance 610 (e.g., a computational instance providing shared services to other computational instances). But this distribution is for purposes of example, and the functions of FIG. 6A can be distributed between computational instance 600 and central instance 610 in other ways. For instance, more software functionality may be executed by central instance 610, or all software functionality may be executed by computational instance 600.

Monitoring module 602 may collect data from various sub-systems of computational instance 600. This data may be values of attributes of interest (e.g., processor utilization, memory utilization, etc.).

Alert management module 604 ingests these data and generates alerts therefrom. As noted above, alerts may be generated in various ways, typically based on values of attributes passing pre-defined thresholds.

Big data processing module 606 ingests the generated alerts and performs trending and feature extraction. Given that the number of alerts may be in the thousands, tens of thousands, or even more, a big data platform may be used (e.g., Apache Impala). A periodic automated process may extract pre-defined alert data of interest and perform trending on these data. Big data processing module 606 also generates partial training vectors from the processed data. These partial training vectors may be stored on computational instance 600 for some length of time.

Predictive escalations module 608 associates the partial training vectors generated and stored by big data processing module 606 with indications of failure. In some cases, these indications may be manually entered by a human expert. For example predictive escalations module 608 may display a partial training vector to the human expert, and the human expert may utilize their knowledge of computational instance behavior to indicate whether a computational instance exhibiting the behavior represented by the partial training vector is likely to fail in the near future (e.g., in the next few minutes, hours, or days). Alternatively, if it is known whether the computational instance that produced a partial training vector failed, this ground truth data may be used as the indication. In short, the indication may be a binary value (e.g., 1 for a predicted failure, 0 for no prediction of failure). Regardless, predictive escalations module 608 adds the indications to their associated partial training vectors to form training vectors that are provided to ML trainer 612.

ML trainer 612 may involve a learning algorithm that is applied to the training vectors over one or more iterations. In some cases, ML trainer 612 may employ an ensemble model that involves two or more distinct learning algorithms used in conjunction with one another. A goal of the learning algorithm(s) is to find patterns in the training vectors that maps the elements of the training vectors to the associated indications. Possible learning algorithms may involve or be based on linear regression, logistic regression, decision trees, support vector machines, naïve Bayes techniques, various types of neural networks, k-means clustering, random forests, dimensionality reduction, and gradient boosting, for example.

Once it is complete, ML trainer 612 produces trained ML model 614 (e.g., a set of parameters and/or hyper-parameters for one or more ML techniques), and provides it to computational instance 600. For purposes of the embodiments herein, ML trainer 612 may be configured to produce a binary classifier. Alternatively, non-binary classifiers could be used as well.

Note that, in some cases, trained ML model 614 may be produced based on training vectors from multiple computational instances. In this fashion, trained ML model 614 be able to predict a wider array of failure types than if it is trained just on training vectors from a single computational instance. On the other hand, it may lose the ability to predict some kinds of instance-specific failures.

Figure 6B:
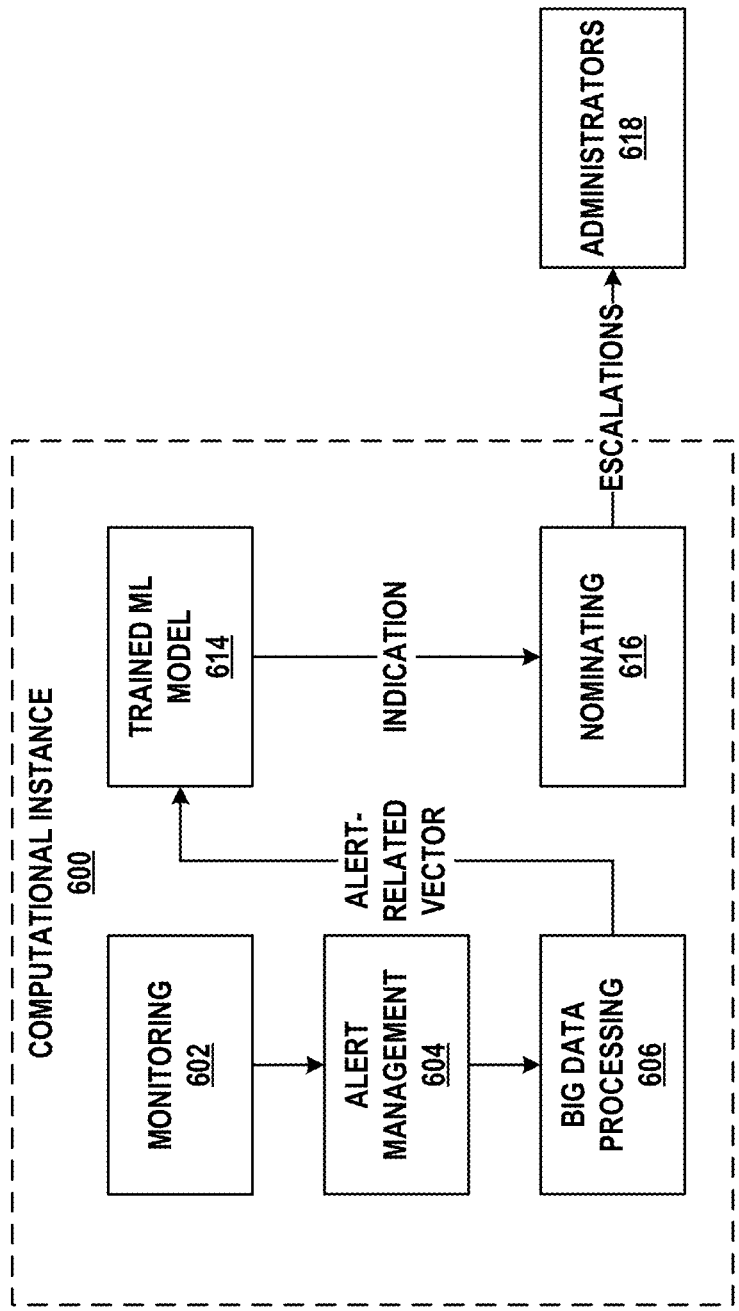
FIG. 6B depicts applying a trained machine learning model, in accordance with example embodiments.

A block diagram of a software architecture for executing a trained ML model is shown in FIG. 6B. In this diagram, all software functionality takes place on computational instance 600, but in some cases certain functionality could be offloaded to a central instance. The procedure illustrated by FIG. 6B is intended to be carried out periodically, perhaps once per hour, once per day, or at some other frequency.

Monitoring module 602, alert management module 604, and big data processing module 606 may perform as described above, except their ultimate input is based on the values that attributes of interest take on during operation of computational instance 600. Further, big data processing module 606 may produce an alert-related vector and provide this vector to trained ML model 614. An alert-related vector may be formatted the same or similarly to that of a partial training vector, in that there is no indication of failure therein. Instead, the indication of failure is predicted by trained ML model 614.

To that point, trained ML model 614 ingests the alert-related vector, processes this vector with its structure as modified by the parameters and/or hyper-parameters derived from training, and produces an indication (e.g., 1 for a predicted failure, 0 for no prediction of failure).

Nominating module 616 may ingest indications and apply pre-defined nomination rules to determine whether any indications of failure should be escalated to administrators 618. The nomination rules may be specific to an enterprise that uses computational instance 600, and may involve considerations of whether the type of customer support package that the enterprise has, the number of the same or similar indications of failure that have occurred recently (e.g., in the last hours, day, week, or month), and manual expert review. Indications of failure that meet the requirements set forth in the nomination rules become escalations.

VII. Alert-Related Statistics

As noted above, big data processing module 606 may perform feature extraction on alert data. Various types of alerts may be considered. Further, feature extraction may be performed over alerts binned into observation periods. Each observation period is a regular length of time that serves as the baseline for calculating alert statistics. For example, an observation period could be 20 minutes, an hour, 6 hours, a day, a week, and so on. Additionally, for purposes of trending, the most recent n>1 observation periods are used for statistical calculations.

In the discussion below, the observation period is assumed to be 1 day and n is assumed to be 28. Thus, certain statistics are calculated per day for each of the last 28 days. But other observation periods and values of n may be used.

The alert data may relate to a computational instance in general (e.g., all alerts generated by the computational instance) or to a specific service or set of services provided by the computational instance (e.g., a web service or an email service). As noted, an alert can be generated or cancelled based on a value of a system attribute passing a pre-defined threshold.

TABLE 2

| Statistic | Description | Example |
| --- | --- | --- |
| Total alert count | The number of generated alerts | 5 total alerts |
| Alert diversity | The number of unique types of alerts | 2 semaphore alerts and 3 HTTP node alerts = 2 types of alerts |
| Median alert duration | The median duration of alerts | [3, 7, 10, 35, 233] = 10 |
| Mean alert duration | The mean duration of alerts | [3, 7, 10, 35, 233] = 57.6 |
| Median peak ratio | Busiest hour (in terms of alert count) in the observation period divided by the busiest hour over the previous m ≤ n observation periods | [0.3, 0.31, 0.42, 0.76, 1.0] = 42% |
| Mean peak ratio | Busiest hour (in terms of alert count) in the observation period divided by the busiest hour over the previous m ≤ n observation periods | [0.3, 0.31, 0.42, 0.76, 1.0] = 56% |
| Alert group 1 count | The number of generated alerts from alert types of highest severity | 2 semaphore alerts = 2 |
| Alert group 2 count | The number of generated alerts from alert types of second highest severity | 0 memory utilization alerts = 0 |
| Alert group 3 count | The number of generated alerts from alert types related to email and events | 0 email and event alerts = 0 |
| Alert group 4 count | The number of generated alerts from alert types that tend to oscillate | 3 HTTP node alerts = 3 |
| Unique task count | Removes duplicate alerts related to same service or module | 2 alerts connected to Service A, 1 alert connected to Service B, and 3 alerts with no specified service = 5 |

Examples of statistics calculated from alert data are shown in Table 2. Each of these statistics is based on aggregated alerts during an observation period unless stated otherwise. For example, "total alert count" is the total number of alerts generated by the computational instance within an observation period. In another example, mean alert duration is the average number of minutes that an alert lasted in the observation period.

On the other hand, mean peak ratio considers the alert count of the busiest hour in the observation period, and compares this value to the busiest hour within the last m observation periods. Given that an observation period is typically a day, the value of m may be 7 for example, to compare the busiest hour of a given day to that of the 7-day (weekly) period ending in that day. Or, put another way, a mean peak ratio of 0.2 would indicate that alerts were occurring, on average, at a period of time when total system traffic was about 20% of the peak system traffic.

Also as shown in Table 2, alerts may be placed in alert groups that aggregate alert counts or other statistics over all alerts in the alert group. These alert groups may be arranged based on alert type or severity of alert type. For example, alert group 1 may include alert types that are most likely to be indicative of an upcoming failure, alert group 2 may include alert types that are important but less indicative of an upcoming failure, and so on. For purposes of example, Table 2 shows an arrangement of semaphore alert types into alert group 1, memory utilization alert types into alert group 2, email and event alert types into alert group 3, and HTTP node alert types into alert group 4. Other arrangements are possible with more or few alert groups and different alert types per alert group.

Additional alert-related statistics may be calculated based on alert counts over n observation periods. These further statistics may provide information regarding computational instance characteristics that may be indicative of failure. When provided as input to the ML trainer, they give the ML trainer the ability to identify additional factors predictive of failure.

A. Trends

Examining trends in alert data can identify when alerts are gradually increasing, gradually decreasing, or staying relatively static over time. For example, a linear regression can be applied to alert data over the last n observation periods. One result of such a calculation is a slope that indicates such trends. The closer the slope is to 0, the less of a trend is apparent.

Figure 7A:
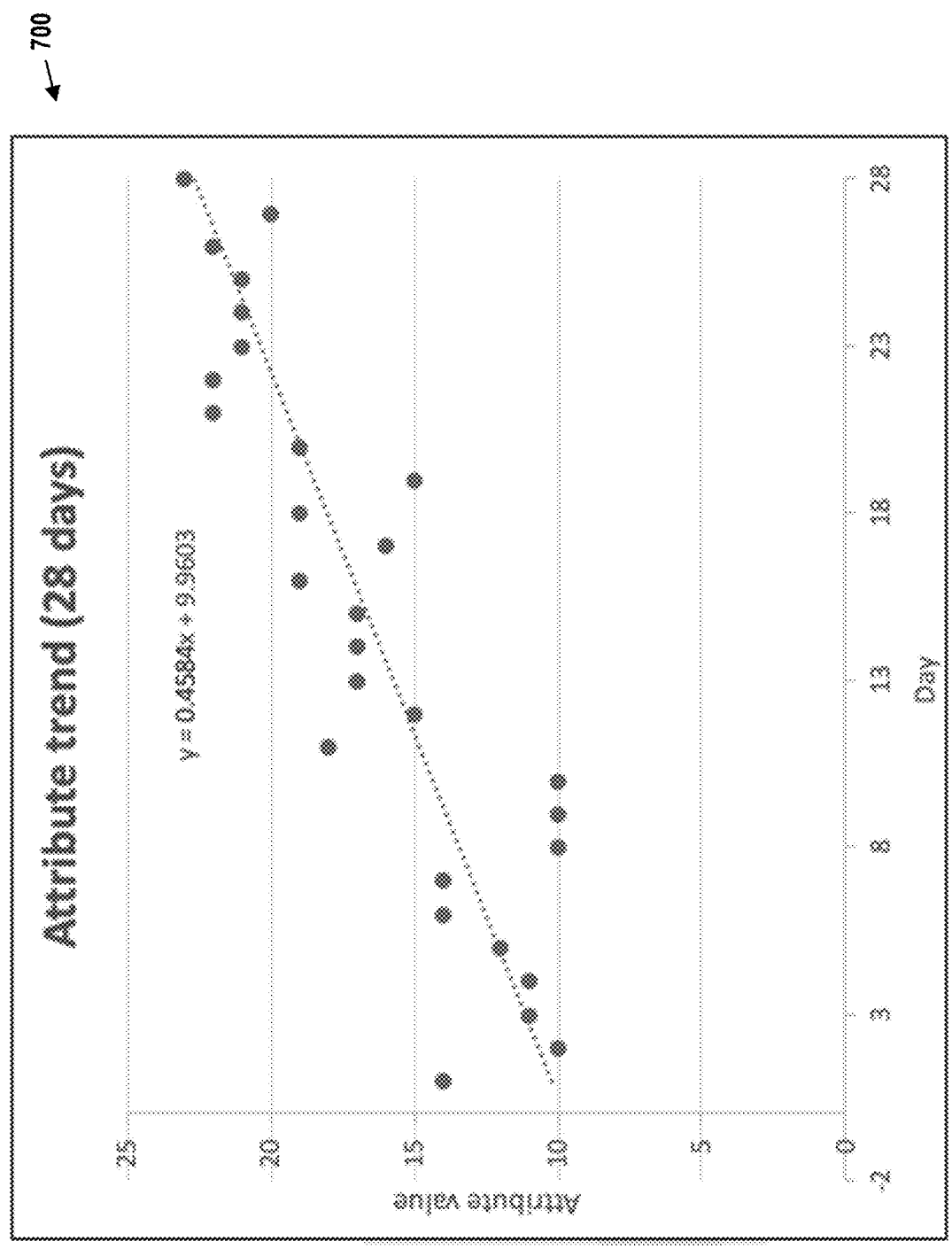
FIGS. 7A, 7B, and 7C visually represent statistical calculations that can be performed on alert data, in accordance with example embodiments.

FIG. 7A shows an example in graph 700. Values of a given alert (e.g., total alert count) are plotted per day over 28 days. The calculated slope of the regression line is 0.4584, indicating an upward trajectory. Depending on the type of alert or the alert group over which the regression is calculated, an upward slope or downward slope might be indicative of an impending failure. Further, the magnitude of the slope may also be taken into account. For instance, a slope of 0.4584 for total alert count may be problematic, but a slope of 0.0012 for total alert count might not be significant.

B. Variance

The variance (squared standard deviation) of alert data is also helpful in predicting failures, especially with other statistics. For instance, if the mean value of an alert count is low but the variance is high, this might indicate that alerts tend to be clustered in time or transient. Generally, this is not expected to indicate an impending failure. On the other hand, if the mean value of an alert count is high and the variance is also high, alerts are being generated at a high rate with large variability. Such patterns have been observed to be predictive of failure.

Figure 7B:
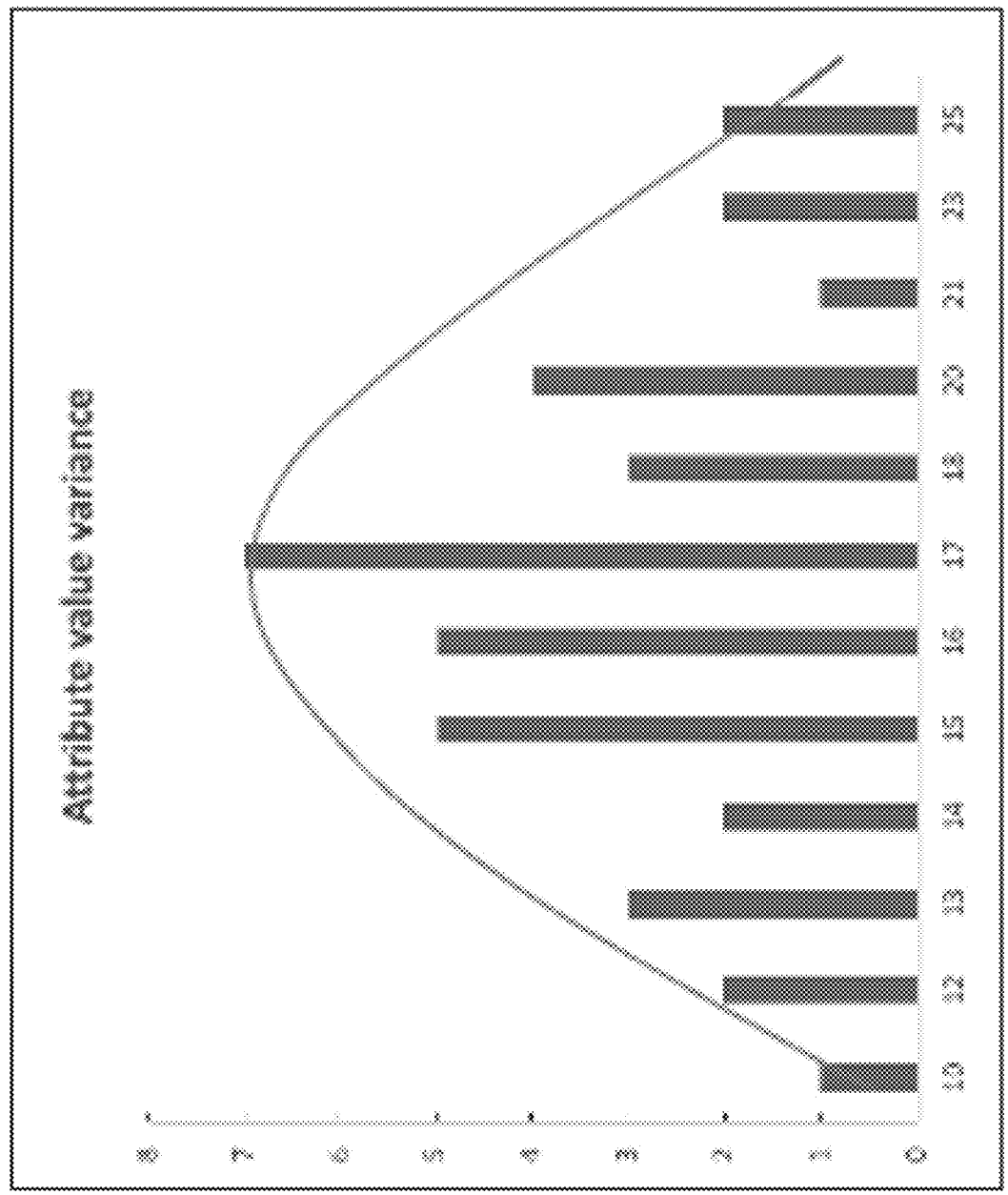

FIG. 7B shows an example in graph 710. The dispersion of a given alert (herein, variance may also be referred to as a type of dispersion) is plotted per day over 28 days, with the x-axis indicating a number of alerts generated and the y-axis indicating a number of days on which this volume of alerts were generated. For example, there was one day with 10 alerts, 2 days with 12 alerts, 3 days with 13 alerts, and so on.

In some cases, the numerical value of variance can be calculated. In other cases, a different dispersion statistic may be used, such as standard deviation, range (highest value minus lowest value), or interquartile range ($75^{th}$ percentile minus 25% percentile).

C. Decay

Alert data may also be considered over time with more weight given to recent observations. This use of decay reflects the understanding that more recent alert data is more relevant to future system performance and stability than older alert data.

For example, a low-pass filter or other weighting may be applied to the values of given alert data over the last n observation periods. The weighting factor $\alpha$ may be between 0 and 1, and is exponentially decreased for progressively older alert data. For the ith observation period (where the oldest observation period is the first and the most recent observation period is the nth), the weighted alert value may be expressed as $$v'_i = \alpha^{n+1-i} v_i$$

Thus, for the most recent observation period, the weighting factor is just a, for the second most recent observation period, the weighting factor is a 2, for the third most recent observation period, the weighting factor is a 3, and so on.

Figure 7C:
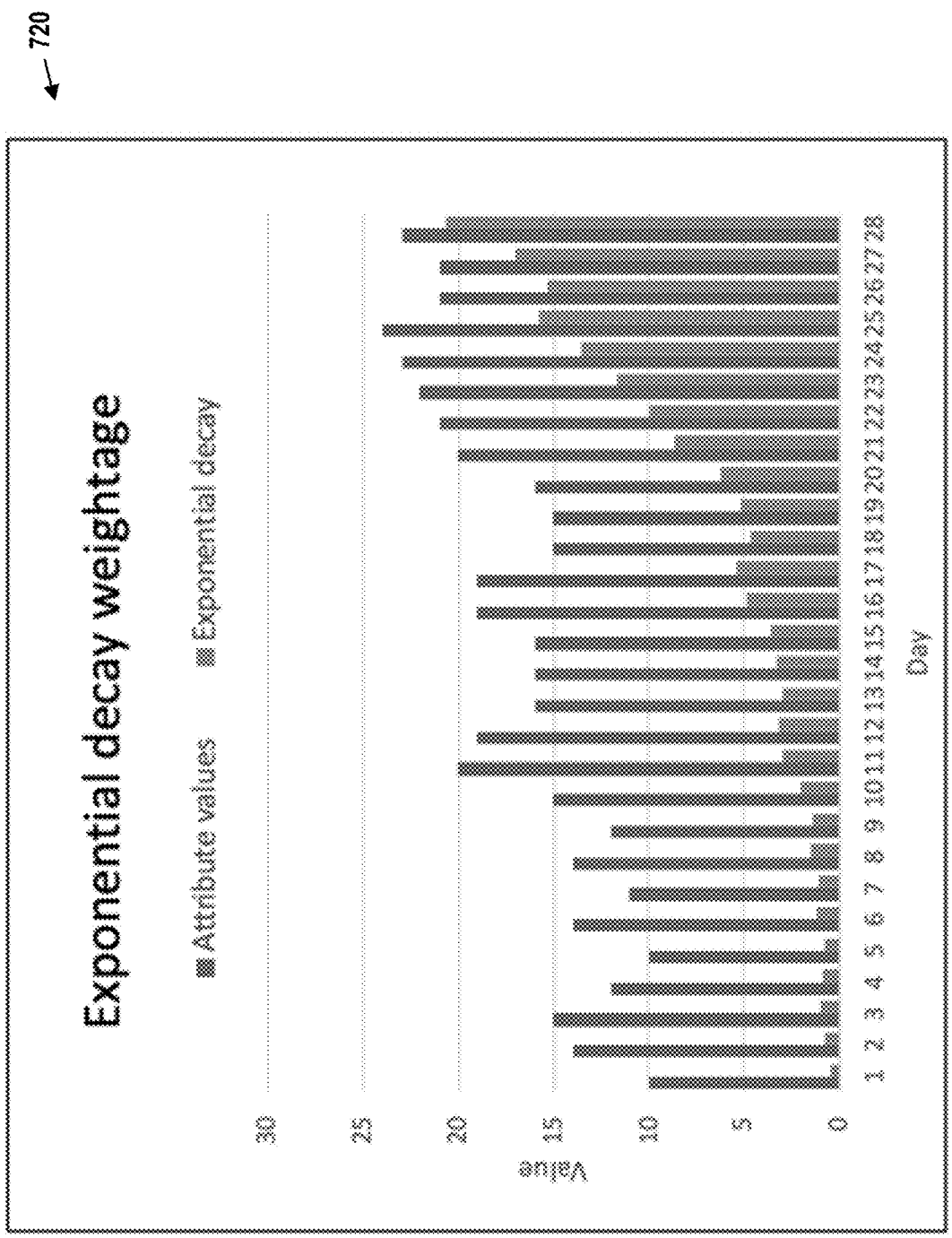

FIG. 7C shows an example in graph 720 for $\alpha=0.9$. For each of the 28 observation periods (days), the left bar shows the raw alert value ($v_i$) and the right bar shows the weighted alert value ($v'_i$). As can be seen, more recent observations are given the most weight and older observations are given the least weight.

Despite the example of an exponential weighting factor given above, other types of weighting factors may be used. For instance, autoregressive and/or moving average stochastic processes could be applied to form a weighting factor.

VIII. Example Vectors and ML Training

As discussed above, an ML model can be trained with a set of training vectors, each including alert-related statistics and an indication of whether a computing system exhibiting these alert-related statistics has failed or would be expected to fail. Once trained, the ML model can ingest an alert-related vector including alert-related statistics from an operational computing system. The alert-related vector may be formatted the same or similarly to that of a training vector, but without the indication. Instead, the ML model predicts whether the operational computing system is expected to fail based on the alert-related vector and how the ML model has been trained.

Figure 8:
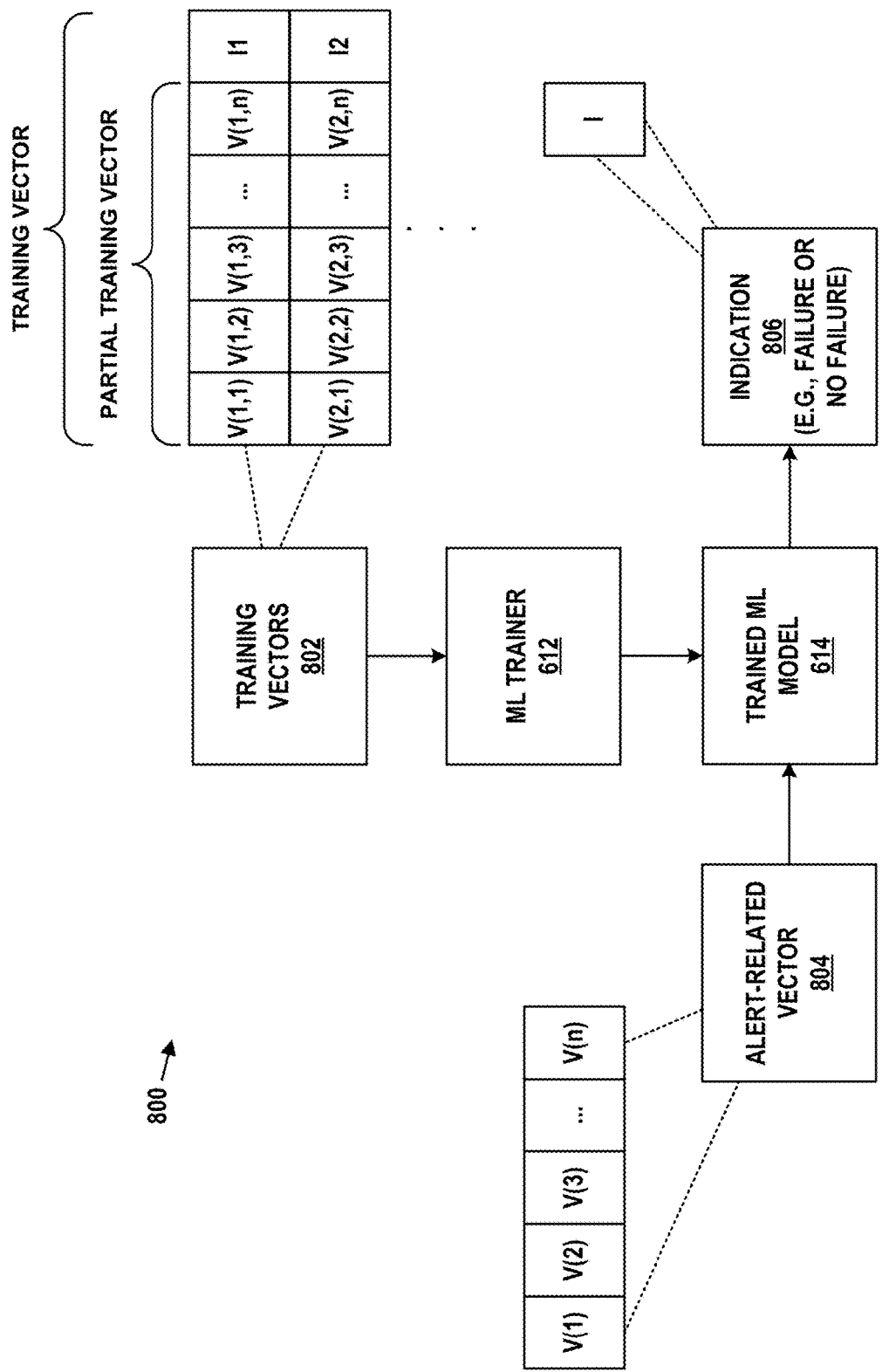
FIG. 8 depicts training a machine learning model with training vectors and applying the trained learning model to alert-related vectors, in accordance with example embodiments.

FIG. 8 illustrates this process in flow diagram 800. Training vectors 802 are a number of training vectors (which may be in the dozens, hundreds, thousands, or more), each with a partial training vector of alert-related statistics and an indication of failure. As shown in the callout for training vectors 802, the first training vector includes a partial training vector of elements:

[V(1,1), V(1,2), V(1,3), ..., V(1, n)]

Along with indication 11. Likewise, the second training vector includes a different partial training vector of elements:

[V(2,1), V(2,2), V(2,3), ..., V(2, n)]

Along with indication 12. Each of these elements, V(x, y), may be any of the alert-related statistics described herein.

ML trainer 612 ingests training vectors 802 and produces trained ML model 614. As noted above, the learning algorithm of ML trainer 612 may employ any one or more of linear regression, logistic regression, decision trees, support vector machines, naïve Bayes techniques, various types of neural networks, k-means clustering, random forests, dimensionality reduction, and gradient boosting techniques, for example.

Once trained ML model 614 is deployed, it can be used in production. For example, alert-related vector 804 may be obtained from an operational computing system. As shown, this vector takes the form:

[V(1), V(2), V(3), ..., V(n)]

Thus, alert-related vector 804 may be arranged the same or similarly to that of a partial training vector, and the corresponding elements of each may contain respective values of the same alert-related statistics.

Trained ML model 614 ingests alert-related vector 804 and, based on its structure and training, produces indication 806. As noted, indication 806 is prediction of whether the operational computing system is likely to fail in the near future (e.g., the coming hours, days, weeks, etc.).

The training process carried out by ML trainer 612 may take place periodically or from time to time. For instance, ML trainer 612 may be given a new set of training vectors to produce a new trained ML model once per week, per month, per quarter, or at some other frequency. Similarly, the application of trained ML model 614 to alert-related vectors from a particular computing system may also take place periodically or from time to time. For instance, trained ML model 614 may be given a new alert-related vector to produce a new indication once per hour, per day, per week, or at some other frequency.

FIG. 9 provides an example annotated alert-related vector 900 with labeled elements. Alert-related vector 900 may have been provided to a trained ML model which then produced indication 902 and confidence 904.

Indication 902 specifies that an escalation is not proposed, which is a way of representing that that alert-related statistics in alert-related vector 900 are not indicative of failure. Confidence 904 represents the certainty that the trained ML model has in the correctness of indication 902. For example, a binary classifier using logistic regression or a neural network could provide indication 902 as a prediction. In doing so, it may calculate probabilities of whether this prediction is true or false (where the probabilities sum to 1.0), and select the value with the higher probability as the prediction. In such a case, the probability of the selected prediction can be used as confidence 904. A similar technique can be used for non-binary classifiers that produce more than just two possible recommendations.

The shown elements of alert-related vector 900 include the alert-related statistics described above. For instance, total alert count, mean duration, and various peak ratios are present. Further, regression, dispersion (e.g., variance), and decay statistics are present for each of the alert groups one, two, three, and four.

The alert data shown in alert-related vector 900 may vary with implementation. For example, more or fewer alert groups may be used. Further, this alert data may be derived from all alerts generated by a computing system over a period of time, or only a subset of those alerts. For example, some implementations might only consider alerts generated by or in relation to an application or service of interest.

IX. Experimental Results

The embodiments described herein have been implemented and tested on actual alert data gathered from computational instances. To establish the accuracy and usefulness of the predicted indications of failure, correct negatives, false negatives, correct positives, and false positives are considered.

TABLE 3

| | |
|---|---|
| Correct negatives | 94% |
| False negatives | 6% |
| Correct positives | 99% |
| False positives | 1% |

As an example, Table 3 establishes that the embodiments herein can achieve 1% false positives. Even though some false negatives are present, this amount is small and generally acceptable in practice (escalations may be handled by a small team of administrators and thus it is desirable to avoid unnecessary effort).

TABLE 4

| | |
|---|---|
| Correct negatives | 100% |
| False negatives | 0% |
| Correct positives | 90.6% |
| False positives | 9.4% |

On the other hand, Table 4 establishes that if a higher false positive rate is acceptable, the false negative rate can be brought down to 0%. The probability (confidence) thresholds can be used to minimize either false-positives or false-negatives, whichever is most desirable. Further, some escalations may be considered only if the confidence is greater than a predefined value (e.g., 70%, 80%, 90%, etc.).

X. Example Operations

Figure 10:
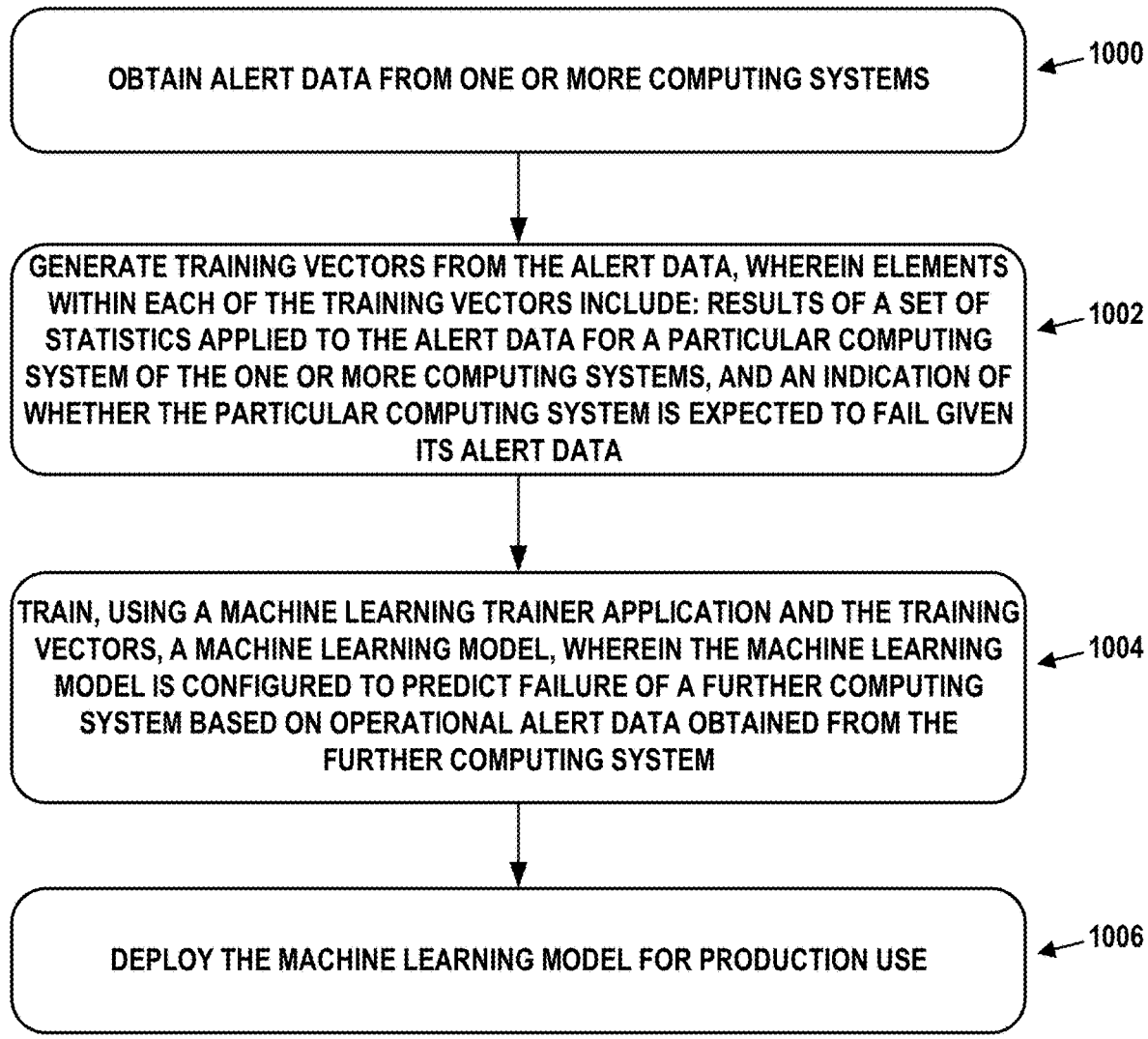
FIGS. 10 and 11 are flow charts, in accordance with example embodiments.

FIG. 10 is a flow chart illustrating an example embodiment. The process illustrated by FIG. 10 may be carried out by a computing device, such as computing device 100, and/or a cluster of computing devices, such as server cluster 200. However, the process can be carried out by other types of devices or device subsystems. For example, the process could be carried out by a computational instance of a remote network management platform or a portable computer, such as a laptop or a tablet device.

The embodiments of FIG. 10 may be simplified by the removal of any one or more of the features shown therein. Further, these embodiments may be combined with features, aspects, and/or implementations of any of the previous figures or otherwise described herein.

Block 1000 may involve obtaining alert data from one or more computing systems.

Block 1002 may involve generating training vectors from the alert data, wherein elements within each of the training vectors include: results of a set of statistics applied to the alert data for a particular computing system of the one or more computing systems, and an indication of whether the particular computing system is expected to fail given its alert data.

Block 1004 may involve training, using a machine learning trainer application and the training vectors, a machine learning model, wherein the machine learning model is configured to predict failure of a further computing system based on operational alert data obtained from the further computing system.

Block 1006 may involve deploying the machine learning model for production use.

Some embodiments may involve receiving the operational alert data obtained from the further computing system; applying the machine learning model to the operational alert data; and obtaining, from the machine learning model, the indication of whether the further computing system is predicted to fail given the operational alert data.

Some embodiments may involve applying one or more pre-defined escalation rules to the indication; and based on applying the one or more pre-defined escalation rules to the indication, determining whether to notify an administrator of the further computing system of the indication.

In some embodiments, the alert data is aggregated into an ordering of alert groups, and at least some of the statistics are applied on basis of the alert groups.

In some embodiments, the alert groups are ordered based on relevance of the alert data therein to likelihood of failure.

In some embodiments, the alert data is organized into observation periods, and the statistics include calculation of a slope of a subset of the alert data over two or more of the observation periods.

In some embodiments, the alert data is organized into observation periods, and the statistics include calculation of a dispersion of a subset of the alert data over two or more of the observation periods.

In some embodiments, the alert data is organized into observation periods, and the statistics include calculation of an exponential decay of a subset of the alert data over two or more of the observation periods.

In some embodiments, the indication of whether the particular computing system is expected to fail given its alert data is based on the particular computing system actually failing within a pre-defined time period of producing its alert data.

In some embodiments, the indication of whether the particular computing system is expected to fail given its alert data is based on a human expert determining that the particular computing system is likely to fail within a pre-defined time period of producing its alert data.

In some embodiments, generating the training vectors from the alert data comprises: generating partial training vectors from the alert data; receiving indications of failure related to each of the partial training vectors; and combining the partial training vectors with their respective indications of failure to obtain the training vectors.

Figure 11:
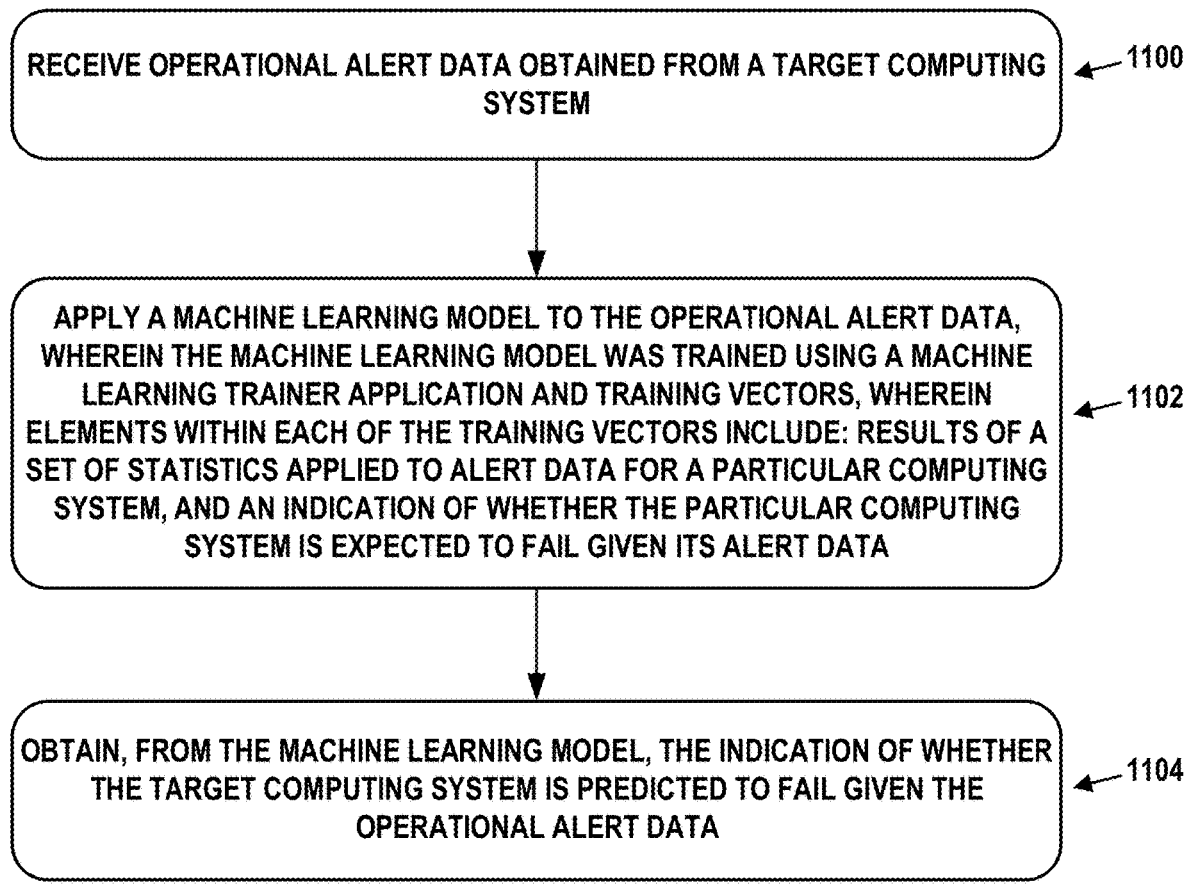

FIG. 11 is a flow chart illustrating an example embodiment. The process illustrated by FIG. 11 may be carried out by a computing device, such as computing device 100, and/or a cluster of computing devices, such as server cluster 200. However, the process can be carried out by other types of devices or device subsystems. For example, the process could be carried out by a computational instance of a remote network management platform or a portable computer, such as a laptop or a tablet device.

The embodiments of FIG. 11 may be simplified by the removal of any one or more of the features shown therein. Further, these embodiments may be combined with features, aspects, and/or implementations of any of the previous figures or otherwise described herein.

Block 1100 may involve receiving operational alert data obtained from a target computing system.

Block 1102 may involve applying a machine learning model to the operational alert data, wherein the machine learning model was trained using a machine learning trainer application and training vectors, wherein elements within each of the training vectors include: results of a set of statistics applied to alert data for a particular computing system, and an indication of whether the particular computing system is expected to fail given its alert data.

Block 1104 may involve obtaining, from the machine learning model, the indication of whether the target computing system is predicted to fail given the operational alert data.

XI. Closing

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid-state drive, or another storage medium.

The computer readable medium can also include non-transitory computer readable media such as non-transitory computer readable media that store data for short periods of time like register memory and processor cache. The non-transitory computer readable media can further include non-transitory computer readable media that store program code and/or data for longer periods of time. Thus, the non-transitory computer readable media may include secondary or persistent long-term storage, like ROM, optical or magnetic disks, solid-state drives, or compact disc read only memory (CD-ROM), for example. The non-transitory computer readable media can also be any other volatile or non-volatile storage systems. A non-transitory computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments could include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system comprising:
   persistent storage containing a machine learning trainer application configured to apply one or more learning algorithms; and
   one or more processors configured to:
     obtain alert data from one or more computing systems within a managed network, wherein the alert data reflects an attribute of a system component associated with a particular computing system of the one or more computing systems;
     generate training vectors from the alert data, wherein elements within each of the training vectors include: results of a set of statistics applied to the alert data for the particular computing system of the one or more computing systems, and an indication of whether the particular computing system is expected to fail given its alert data;
     train, using the machine learning trainer application and the training vectors, a machine learning model, wherein the machine learning model is configured to predict failure of a further computing system based on operational alert data obtained from the further computing system; and
     deploy the machine learning model for production use with the managed network.

2. The system of claim 1, wherein the one or more processors are further configured to:
   receive the operational alert data obtained from the further computing system;
   apply the machine learning model to the operational alert data; and
   obtain, from the machine learning model, the indication of whether the further computing system is predicted to fail given the operational alert data.

3. The system of claim 1, wherein the one or more processors are further configured to:
   apply one or more pre-defined escalation rules to the indication; and
   based on applying the one or more pre-defined escalation rules to the indication, determine whether to notify an administrator of the further computing system of the indication.

4. The system of claim 1, wherein the alert data is aggregated into an ordering of alert groups, and wherein at least some of the statistics are applied on basis of the alert groups.

5. The system of claim 4, wherein the alert groups are ordered based on relevance of the alert data therein to likelihood of failure.

6. The system of claim 1, wherein the alert data is organized into observation periods, and wherein the statistics include calculation of a slope of a subset of the alert data over two or more of the observation periods.

7. The system of claim 1, wherein the alert data is organized into observation periods, and wherein the statistics include calculation of a dispersion of a subset of the alert data over two or more of the observation periods.

8. The system of claim 1, wherein the alert data is organized into observation periods, and wherein the statistics include calculation of an exponential decay of a subset of the alert data over two or more of the observation periods.

9. The system of claim 1, wherein the indication of whether the particular computing system is expected to fail given its alert data is based on the particular computing system actually failing within a pre-defined time period of producing its alert data.

10. The system of claim 1, wherein the indication of whether the particular computing system is expected to fail given its alert data is based on a human expert determining that the particular computing system is likely to fail within a pre-defined time period of producing its alert data.

11. A system comprising:
    persistent storage containing a machine learning trainer application configured to apply one or more learning algorithms; and
    one or more processors configured to:
      obtain alert data from one or more computing systems;
      generate training vectors from the alert data, wherein generating the training vectors is further configured to:
        generate partial training vectors from the alert data;
        receive indications of failure related to each of the partial training vectors; and
        combine the partial training vectors with their respective indications of failure to obtain the training vectors, and wherein elements within each of the training vectors include: results of a set of statistics applied to the alert data for a particular computing system of the one or more computing systems, and an indication of whether the particular computing system is expected to fail given its alert data;
      train, using the machine learning trainer application and the training vectors, a machine learning model, wherein the machine learning model is configured to predict failure of a further computing system based on operational alert data obtained from the further computing system; and deploy the machine learning model for production use.

12. A computer-implemented method comprising:

obtaining alert data from one or more computing systems within a managed network, wherein the alert data reflects an attribute of a system component associated with a particular computing system of the one or more computing systems;

generating training vectors from the alert data, wherein elements within each of the training vectors include: results of a set of statistics applied to the alert data for the particular computing system of the one or more computing systems, and an indication of whether the particular computing system is expected to fail given its alert data;

training, using a machine learning trainer application and the training vectors, a machine learning model, wherein the machine learning model is configured to predict failure of a further computing system based on operational alert data obtained from the further computing system; and deploying the machine learning model for production use.

13. The computer-implemented method of claim 12, further comprising:

receiving the operational alert data obtained from the further computing system;

applying the machine learning model to the operational alert data; and obtaining, from the machine learning model, the indication of whether the further computing system is predicted to fail given the operational alert data.

14. The computer-implemented method of claim 12, further comprising:

applying one or more pre-defined escalation rules to the indication; and based on applying the one or more pre-defined escalation rules to the indication, determining whether to notify an administrator of the further computing system that of the indication.

15. The computer-implemented method of claim 12, wherein the alert data is aggregated into an ordering of alert groups, and wherein at least some of the statistics are applied on basis of the alert groups.

16. The computer-implemented method of claim 15, wherein the alert groups are ordered based on relevance of the alert data therein to likelihood of failure.

17. The computer-implemented method of claim 12, wherein the alert data is organized into observation periods, and wherein the statistics include: calculation of a slope of a subset of the alert data, calculation of a dispersion of the subset of the alert data, and calculation of an exponential decay of the subset of the alert data over two or more of the observation periods.

18. The computer-implemented method of claim 12, wherein the indication of whether the particular computing system is expected to fail given its alert data is based on a human expert determining that the particular computing system is likely to fail within a pre-defined time period of producing its alert data.

19. A computer-implemented method comprising:

obtaining alert data from one or more computing systems;

generating training vectors from the alert data, wherein generating includes:

generating partial training vectors from the alert data;

receiving indications of failure related to each of the partial training vectors; and combining the partial training vectors with their respective indications of failure to obtain the training vectors, wherein elements within each of the training vectors include: results of a set of statistics applied to the alert data for a particular computing system of the one or more computing systems, and an indication of whether the particular computing system is expected to fail given its alert data;

training, using a machine learning trainer application and the training vectors, a machine learning model, wherein the machine learning model is configured to predict failure of a further computing system based on operational alert data obtained from the further computing system; and deploying the machine learning model for production use.

20. A computer-implemented method comprising:

receiving operational alert data obtained from a target computing system within a managed network, wherein the alert data reflects an attribute of a system component associated with the target computing system;

applying a machine learning model to the operational alert data, wherein the machine learning model was trained using a machine learning trainer application and training vectors, wherein elements within each of the training vectors include: results of a set of statistics applied to alert data for a particular computing system, and an indication of whether the particular computing system is expected to fail given its alert data; and obtaining, from the machine learning model, the indication of whether the target computing system is predicted to fail given the operational alert data.

* * * * *